United States Patent

[11] 3,607,991

[72] Inventors Willard D. Peterson
  Pasadena;
  Gilbert L. DuPertuis, La Habra, both of Calif.
[21] Appl. No. 714,814
[22] Filed Mar. 21, 1968
[45] Patented Sept. 21, 1971
[73] Assignee Kerr-McGee Corporation
  Continuation-in-part of application Ser. No. 385,499, July 27, 1964.

[54] PROCESS FOR PREPARING PHOSPHATE ESTERS
  10 Claims, No Drawings
[52] U.S. Cl. .................................................. 260/973,
  260/248, 260/251, 260/256, 260/343.2
[51] Int. Cl. ........................................................ C07f 9/08
[50] Field of Search ........................................... 260/972, 973, 975

[56] References Cited
UNITED STATES PATENTS
3,294,875 12/1966 Mannes et al. ................. 260/973 X
3,351,682 11/1967 Baker et al. .................... 260/973

Primary Examiner—Charles B. Parker
Assistant Examiner—Richard L. Raymond
Attorney—William G. Addison ABSTRACT: A process for preparing phosphorothioate and phosphorodithioate esters by reacting a Chloro-0, 0-dialkylphosphorothioate 0-dialkylphosphorothioate with an alkali metal salt of an organic compound which has a pKa value of from about 7 to 12, in the presence of a trimethylamine catalyst. The use of trimethylamine as the catalyst for the reaction enables the reaction to be carried out at relatively low temperatures, that is, between about 0° and 80° C., with the reaction being completed in a relatively short period of time.

PROCESS FOR PREPARING PHOSPHATE ESTERS

This application is a continuation-in-part of copending U.S. application, Ser. No. 385,499, filed July 27, 1964.

BACKGROUND OF THE INVENTION

1. Field of Invention

This invention relates to a process for preparing organic phosphate esters. More particularly, the invention relates to an improved process for preparing phosphorothioate and phosphorodithioate esters whereby such esters can be produced in high yield without the use of extreme reaction conditions.

2. Description of the Prior Art

Certain organic phosphorothioate and phosphorodithioate compounds, such as O-arene-O,O-dialkylphosphorothioates, O-heterocyclic-O,O-dialkylphosphorothioate, S-heterocyclic-O,O-dialkylphosphorodithioate and S-arene-O,O-dialkylphosphorodithioates enjoy utility as insecticides and the like. Such compounds are particularly advantageous when used as insecticides since they hydrolyze and degrade rapidly whereby in a matter of a few weeks after their application, they are substantially harmless, nontoxic phosphorous compounds.

Heretofore, certain difficulties have been experienced in preparing such phosphorothioate and phosphorodithioate compounds. Thus, it has been necessary to prepare these compounds at a relatively high reaction temperature, that is about 90° to 110° C. in order to provide an acceptable rate of reaction. However, such high temperatures cause hydrolytic decomposition of the product and result in the formation of undesirable byproducts. Consequently, the product yield in such prior art processes was relatively poor, that is only about 75% to 85% of theoretical. In addition, a relatively long period of time is usually required for completion of the reaction in such prior processes. Also, catalyzed reactions generally required extensive refrigeration to control the vigorous reaction to prevent the formation of certain undesirable byproducts.

SUMMARY OF THE INVENTION

The present invention provides a process for reacting a chloro-O,O-dialkylphosphorothioate with an alkali metal salt of an organic compound having a pKa value of from about 7 to 12, in the presence of a specific catalyst, trimethylamine, to form an O-arene-O,O-dialkylphosphorothioate, O-heterocyclic-O,O-dialkylphosphorothioate, S-heterocyclic-O,O-dialkylphosphorodithioate or an S-arene-O,O-dialkylphosphorodithioate O-dialkylphosphorodithioate product in substantially quantitative yields. Substantially quantitative yields of the organo phosphate ester formed in this reaction can be achieved in short periods of time and at relatively low reaction temperatures by using the specific catalyst, trimethylamine, to catalyze the reaction. The use of trimethylamine as the catalyst in the reaction has been found to provide substantially greater yields in shorter periods of time and at lower temperatures than other catalysts, including the next immediate member of the homologous series, triethylamine.

DESCRIPTION OF THE PREFERRED EMBODIMENTS

It has now been discovered that trimethylamine will effectively catalyze the reaction of a chloro-O,O-dialkylphosphorothioate with an alkali metal salt of an organic compound having a pKa value of from about 7 to 12 to form an O-arene-O,O-dialkylphosphorothioate, O-heterocyclic-O,O-dialkylphosphorothioate, S-heterocyclic-O,O-dialkylphosphorodithioate or an S-arene-O,O-dialkylphosphorodithioate ester. The use of trimethylamine as a catalyst in the reaction mixture enables the reaction to be completed in relatively short periods of time at relatively low temperatures with high products yields.

Thus, when the reaction is carried out in the presence of a trimethylamine catalyst, the reaction may be carried out at temperatures in the range of from about 0° to 80°C., preferably between about 10° and 45°C., with the reaction being substantially complete within a period of time of from about 5 minutes to 3 hours or more. Product yields of about 100% of theoretical may be obtained by present process.

In the process of the present invention, O-arene-O,O-dialkylphosphorothioate, O-heterocyclic-O,O-dialkylphosphorothioate, S-heterocyclic-O,O-dialkylphosphorodithioate or S-arene-O,O-dialkylphosphorodithioate esters are prepared according to the equation:

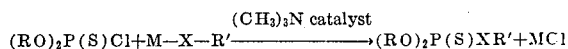

$$(RO)_2P(S)Cl + M-X-R' \xrightarrow{(CH_3)_3N \text{ catalyst}} (RO)_2P(S)XR' + MCl$$

wherein R is an alkyl radical, M is an alkali metal, X is oxygen or sulfur and the R' moiety is an aryl or heterocyclic group.

In this reaction, generally the chloro-O,O-dialkylphosphorothioate is supplied in an organic carrier such as, for example, xylene or toluene. The reaction is carried out by contacting the phosphorothioate reactant with the alkali metal salt of the aryl or heterocyclic compound, which may be introduced in an aqueous phase. The trimethylamine catalyst is usually introduced into the reaction mixture in an aqueous phase. The reaction product is preferably recovered from the reaction mixture as a solution in the organic carrier.

The process is applicable to the preparation of a variety of phosphorothioate and phosphorodithioate esters depending on the reactants used. The chloro-O,O-dialkylphosphorothioate reactant, $(RO)_2P(S)Cl$, may contain alkyl groups which are the same or different and include, for example, methyl, ethyl, butyl, propyl, isopropyl, pentyl, neopentyl, octyl and the like. Generally the alkyl substituents each contain from 1 to 8 carbon atoms. The chloro-O,O-dialkylphosphorothioate reactant used in this process may be produced by known procedures such as those described in U.S. Pat. No. 2,692,891 to Young et al., No. 2,471,464 to Toy et al., and No. 2,575,224 to Manske et al.

The chloro-O,O-dialkylphosphorothioate O-dialkylphosphorothioate is reacted with an alkali metal salt of an organic compound which has a pKa value of about 7 to 12, and preferably between about 8 to 10. These organic compounds are characterized by their ability to form metal salts whose aqueous solution have a pH in the range of from 7 to 12. Organic compounds which may be used as a reactant in the present invention are aryl and heterocyclic compounds containing a hydroxyl or thiol substituent.

Such organic compounds include, for example, phenol; substituted phenols having at least one substituent selected from the group consisting of nitro, methyl, chloro and carbonitrile radicals and mixtures thereof; thiophenol; substituted thiophenols having a substituent which donates electrons to the ring structure; and hydroxyl and thiol derivatives of heterocyclic compounds selected from the group consisting of pyrimidines, coumarins and s-triazine.

Examples of such organic compounds include:
phenol;
p-nitrophenol;
2,4-dinitrophenol;
2,4-dichlorophenol;
2-hydroxy-4-nitronaphthalene;
2-methyl-4-nitrophenol;
paracresol;
2-chloro-4-nitrophenol;
4-chloro-2-nitrophenol;
2-nitro-4-methylphenol;
4-methylphenol;
2,4,6-trichlorophenol;
2,4,5-trichlorophenol;
3-chlorophenol;
4-chlorophenol;
2,5-dichlorophenol;
2,3,4,6-tetrachlorophenol;
2-methyl-4-chlorophenol;
3-methyl-4-chlorophenol;

2-chloro-6methylphenol;
carbonitrilephenol;
thiophenol;
*p*-methylthiophenol;
*p*-methoxythiophenol;
*p*-chlorothiophenol;
2-hydroxypyrimidine;
4-hydroxypyrimidine;
5-hydroxypyrimidine;
2-hydroxy-4-methylpyrimidine;
4-hydroxy-6-methylpyrimidine;
uracil;
2-mecaptopyrimidine;
2-mercapto-4,6-dimethylpyrimidine;
3-chloro-7-hydroxy-4-methylcoumarin;
7-hydroxycoumarin;
6,7-dihydroxycoumarin;
7,8-dihydroxycoumarin;
2,4,6-trihydroxy-*s*-triazine;
and the like.

Preferably, the reaction mixture is provided with a slight excess of the aryl or heterocyclic reactant above the theoretical stoichiometric amount required for complete conversion of the chloro-O,O-dialkylphosphorothioate reactant. The entire amount of aryl or heterocyclic reactant used in the reaction may be added to the reaction mixture at one time, or it may be added in increments as the reaction proceeds.

The organic compound which has a pKa value of from about 7 to 12, is present in the reaction mixture in the form of an alkali metal salt. The term "alkali metal" as used herein includes ammonia and the alkali metals sodium, potassium, cesium, rubidium and lithium. Generally, it is preferred to use a sodium salt of the organic compound. The alkali metal salt of the organic compound may be introduced into the reaction mixture as such, or it may be formed in situ in the reaction mixture by introducing the organic compound and NaOH, $Na_2CO_3$ or the like into the reaction mixture.

The reaction of the chloro-O,O-dialkylphosphorothioate with the alkali metal salt of the aryl or heterocyclic compound is carried out in a liquid reaction medium. Thus, a solvent for the chloro-O,O-dialkylphosphorothioate may be provided in the reaction mixture. The nature of the solvent employed as a carrier for this reactant is not critical as long as it does not interfere with the reaction. In general, the rate of reaction increases somewhat as the polarity of the chloro-O,O-dialkylphosphorothioate solvent increases. Suitable solvents for this reactant include, for example, mono- and dichlorobenzene; 1,2,4-trichloro-benzene; nitrobenzene; toluene; benzene; xylene; chloroform; methylene chloride; ethylene chloride; halogenated aliphatic hydrocarbons; aryl-alkyl ethers such as anisole; diethyl ether and ethylene glycol ethers; and the like.

The reaction may be carried out in pure chloro-O,O-dialkylphosphorothioate or in the O-arene-O,O-dialkylphosphorothioate, O-heterocyclic-O,O-dialkylphosphorothioate, S-heterocyclic-O,O-dialkylphosphorothioate or dithioate product without producing undesirable byproducts. The advantages in using either of these materials as the reaction medium is that problems in the recovery, purification and recycle of solvents are avoided. In general, use of these materials results in faster reaction times.

The reaction mixture may contain as a reaction medium a solvent for the aryl or heterocyclic reactant. The nature of this solvent will, of course, depend on the nature of the aryl or heterocyclic compound used. Suitable solvents include, for example, water, alcohols, ethers or the like.

In addition, the aqueous phase which is obtained when the reaction product is washed with water, as will be described in more detail hereinbelow, may be recycled to the reaction mixture to provide the liquid reaction medium.

The quantity of solvent used in the present process is preferably kept to the minimum necessary to provide adequate mixing and dilution of the reactants. This is so because it is generally preferable to produce a relatively concentrated rather than a dilute mixture of product in the reaction medium. Also, reaction rates tend to increase as the concentration of the reactants increase. In general, at least about 5% by weight of the total reaction mixture is composed of the liquid reaction medium. While the total percentage of reaction medium is not critical and can be as much as about 95% by weight of the reaction mixture, generally, the quantity of reaction medium should not exceed about 30% by weight of the reaction mixture. The total amount of reaction medium in the reaction mixture is determined by such factors as, for example, the capacity of the reaction vessels, the desired concentration of product and reaction rate, and the cost of the liquid medium.

In accordance with the present invention, the reaction is carried out at a pH of from about 7.5 to 11.5 and preferably from about 9.5 to 10.5. The pH of the reaction mixture may be adjusted and maintained within this range by the addition of NaOH or the like to the reaction mixture.

The reaction temperatures at which the process of this invention may be carried out range from 0° C. or even lower up to about 80° C. or higher, as may be convenient. Since the reaction proceeds smoothly at room temperatures, for example, between about 20° C. and about 30° C., operation at such temperatures avoids the necessity for use of complicated and difficult-to-control temperature regulating means. Because of the ease and simplicity of operating at ambient temperatures, it is usually preferred to carry out the process at temperatures which are generally between about 10° and 45° C.

It has been found that an increase in temperature produces a corresponding increase in the rate of reaction, up to a temperature of about 60° C., at which point competing undesirable side reactions begin to take place to the extent that the products yield is reduced and the product becomes contaminated with byproducts. Therefore, temperatures above about 60° C. are generally not preferred.

The trimethylamine catalyst is present in the reaction mixture in an effective amount ranging from about 0.02 to 5 moles of catalyst per mole of the chloro-O,O-dialkylphosphorothioate reactant, and preferably from about 0.08 to 0.5 moles of trimethylamine per mole of chloro-O,O-dialkylphosphorothioate.

Generally, it is preferred to introduce the trimethylamine into the reaction mixture as a dilute aqueous solution that is, in an aqueous solution containing about 5% or less to 50% or more of the trimethylamine. However, the trimethylamine catalyst also lends itself to use as a vapor phase since it is a gas at room temperatures. Thus, the trimethylamine may, if desired, be introduced as a vapor over the reaction mixture.

Under the conditions described hereinabove, the reaction of the present process may be accomplished in periods of time ranging from 5 minutes or less to 3 hours or more. Generally, the reaction is substantially complete within about 2 hours, but longer periods of time may sometimes be required.

At the end of the reaction, the reaction mixture preferably is neutralized or acidified by the addition of a dilute mineral acid to prevent hydrolysis of the reaction product.

The reaction mixture comprises a two-phase system, an organic phase containing the O-arene-O,O-dialkylphosphorothioate, O-heterocyclic-O,O-dialkylphosphorothioate, S-heterocyclic-O,O-dialkylphosphorothioate or S-arene-O,O-dialkylphosphorodithioate reaction product and an aqueous phase containing the alkali metal chloride also formed in the reaction. Upon completion of the reaction and acidification of the reaction mixture the phases are separated and the organic phase preferably washed with water. This wash water may subsequently be recovered and used as the aqueous reaction medium as described hereinabove.

The O-arene-O,O-dialkylphosphorothioate, O-heterocyclic-O,O-dialkylphosphorothioate, S-heterocyclic-O,O-dialkylphosphorothioate, or S-arene-O,O-dialkylphosphorothioate reaction product may be recovered from the organic phase by conventional separation procedures such as distillation, fractional crystallization and the like. Alternatively, the reaction produced may be retained in the organic phase for shipment and use in that form, for example, as an insecticide. If the reaction product is not to be separated from the organic phase, only sufficient solvent is used in the reaction mixture whereby the product is present in the organic phase in quantities amounting to about 50% to 90% by weight. The use of only that amount of solvent necessary to produce such a product concentration obviates the necessity for concentrating the solvent phase.

The following examples are set forth to further illustrate, not to limit, the invention, whereby those skilled in the art may understand better the manner in which the present invention can be carried into effect. In the instant specification, appended claims and the following specific Examples, all parts and percentages are by weight unless otherwise indicated.

EXAMPLE I

A mixture of 178.0 gms. of chloro-O,O-dimethylphosphorothioate (assay 90.7%; 1.0 mole) is added over a period of 35 minutes to a stirred slurry of 221.0 gms. of p-sodium nitrophenate (76% assay; 1.04 mole), 350 ml. of water, 13.0 gms. of xylene and 0.1 mole (in 25 weight % water solution) trimethylamine. The temperature is not allowed to rise above 30° C. and is generally maintained at about 25°C. (because the reaction is mildly exothermic, occasional cooling with tap water is necessary). Initially, the aqueous phase contains p-sodium nitrophenate and the trimethylamine catalyst, and the xylene phase contains chloro-O,O-demethylphosphorothioate The aqueous phase is maintained at pH 8.7-9.1 during the course of the reaction by periodic addition of 25% sodium hydroxide solution.

At the end of this 35-minute period of time, the solid p-sodium nitrophenate has disappeared, leaving two liquid phases.

After stirring for another 30 minutes at 25° C.–26° C., the reaction is quenched by the addition of 25% sulfuric acid to bring the aqueous phase to a pH of 2.5. The organic layer is separated by gravity and the aqueous phase discarded. The aqueous phase contains considerable sodium chloride.

200 ml. of water are added to the organic layer followed by the addition of sufficient 50% sodium hydroxide solution to give the aqueous phase a pH of 11. The aqueous phase is discarded. The organic layer is washed twice with two 150-ml. portions of water. Following these operations, the organic layer is dried over $Na_2SO_4$, and then filtered to give a clear light amber solution of the product, O,O-dimethyl-O p-nitrophenylphosphorothioate.

EXAMPLE II

A 166-gm. (1.03 mole) sample of sodium p-nitrophenate, present as a 74 weight % slurry in water, is charged to a flask with 400 gms. of additional water. The pH of this slurry is adjusted to 9.9 by the addition of sodium hydroxide. A 0.2-mole (12 gms.) sample of trimethylamine catalyst, as a 25 weight % solution in water, is added to the sodium p-nitrophenate slurry.

A mixture of 188.5 gms. (1 mole) of chloro-O,O-diethylphosphorothioate (assay, 25 weight % in toluene) is added over a period of 40 minutes to the stirred slurry of sodium p-nitrophenate.

The pH of the reaction mixture is maintained at a value between about 9.6 and 10 throughout the course of the reaction.

The temperature of the reaction mixture is maintained, by the use of external cooling water, at a value between about 25° C. and 30° C.

The reaction is continued for a period of 1 hour after all of the chloro-O,O-diethylphosphorothioate has been added.

The course of the reaction is monitored by observing the change in the infrared absorption band at 15.2 microns, which is a characteristic band for the chloro-O,O-diethylphosphorothioate. Observation of this band shows that all of this reagent is consumed within 1 hour after its addition to the reaction mixture is completed.

The organic layer containing the O,O-diethyl-O-p-nitrophenylphosphorothioate product is washed several times to purify it. Analysis of this layer indicates a conversion of better than 99.5 % based on the chloro-O,O-diethylphosphorothioate charged to the reaction.

Substantially quantitative yields of product are obtained when the chloro-O,O-diethylphosphorothioate of this example is replaced by $(CH_3CH_2CH_2O)_2PSCl$, $[(CH_3)_2CHO]_2PSCl$, $(CH_3O)(CH_3CH_2O)PSCl$, $[(CH_3)_2CHCH_2O]_2PSCl$, $(CH_3O)(CH_3)_2CHOPSCl$, $(CH_3CH_2O)[(CH_3)_2CHCH_2O]PSCl$, and $[(CH_3)_3(C)_2CH_2O]CH_3OPSCl$, respectively.

A wide variety of solvents produce satisfactory results when used in this process. The substitution of nitrobenzene and anisole, respectively, for the toluene in this example gives excellent results. The rate of reaction is decreased somewhat by the use of dioxane and diethylether, respectively, to replace the toluene in this example.

Repetition of this example using a 25 weight % solution of chloro-O,O-diethylphosphorothioate in toluene, a reaction temperature of between about 30° and 35° C. and a trimethylamine catalyst concentration of about 0.2 molar in the aqueous phase, reduces the reaction time. The time required to complete the reaction after all of the monochloro compound is added is about 30 minutes.

This example is repeated using a 25 weight % solution of chloro-O,O-diethylphosphorothioate in O,O-diethyl-O-p-nitrophenylthiophosphate, a reaction temperature of from about 25° to 30° C., and a 0.2-molar concentration of trimethylamine in the aqueous phase. The reaction requires only about 5 minutes to go to completion after all of the monochloro reactant is added. Substantially, quantitative yields of the O,O-diethyl-O-p-nitrophenylthiophosphate product are obtained.

The trimethylamine catalyst lends itself to use as a vapor phase since it is a gas at room temperatures. This example is repeated in a closed reactor, but instead of introducing the amine as a water solution in the aqueous phase, it is introduced as a vapor over the reaction mixture. The mixture is agitated to bring it into contact with the vapor phase catalyst. The temperatures of the reaction mixture is maintained at about 25° to 30° C. and the reaction is complete in about 45 minutes to give a substantially quantitative yield of product.

An anhydrous stoichiometric reaction mixture of 25 weight % chloro-O,O-diethylphosphorothioate in toluene and sodium p-nitrophenate hydrate is prepared. The sodium p-nitrophenate in this reaction mixture contains about 2 moles of water for every mole of phenate since the water is carried into the mixture as water of crystallization with the phenate. Vapor phase trimethylamine is bubbled into this reaction mixture while it is agitated. The reaction mixture is maintained at a temperature of from about 25° to 30° C. and the reaction is complete in a period of about 40 minutes to give a substantially quantitative yield of O,O-diethyl-O-p-nitrophenylthiophosphate.

Substitution of the corresponding potassium and lithium phenates, respectively, in this example does not materially affect the course or the yield of this reaction.

Substantially, quantitative yields of the desired O-arene-O,O-dialkylphosphorothioates are obtained when the sodium p-nitrophenate employed in this example is replaced by the sodium slats of 3-methyl-4-nitrophenol, 2-chloro-4-nitrophenol, 3-chloro-4-nitrophenol, 2,4,6-trichlorophenol, 2,3,4,6-tetrachlorophenol, 2,4-dinitrophenol and 2-methyl-4-chlorophenol, respectively.

EXAMPLE III

A mixture of 25 gms. (0.21 mole) p-cyanophenol and 67 ml. of 3.1 N NaOH (0.21 mole NaOH) are charged into a reaction vessel and the mixture heated to 50° C. until a homogeneous solution is formed. The solution is then cooled to 25° C. to precipitate sodium carbonitrilephenate.

Five ml. of an aqueous 4 M trimethylamine (0.02 mole) solution are then added to the reaction vessel and the pH of the mixture adjusted to 11.5. To this mixture is added 38 gms. (0.02 mole) chloro-O,O-diethoxyphosphorothioate. The reaction mixture is then agitated while the temperature of the mixture is maintained at about 30°±4° C.

Progress of the reaction is monitored by the disappearance of the chloro-O,O-diethoxyphosphorothioate with simultaneous increase of carbonitrile thiophosphate ester formation in the reaction mixture using infrared techniques. The carbonitrile thiophosphate ester is characterized by a pronounced absorption band at 4.45 microns.

Analysis of the reaction mixture in this manner shows that the reaction is substantially complete within 30 minutes, with a product yield of over 95%.

In order to demonstrate the unexpected superiority of trimethylamine as a catalyst in this reaction, this same procedure is repeated with the single exception that 5 ml. of an aqueous 4 M triethylamine (0.02 mole) solution is added to the reaction mixture instead of the trimethylamine. When triethylamine is used as the catalyst, the reaction is only about 77% complete after 6 hours reaction time.

EXAMPLE IV

A reactor is charged with an initial reactant 20.2 gms. (0.21 mole) 4-hydroxypyrimidine and 67 ml. of 3.1 N sodium hydroxide solution (0.21 mole NaOH). Solution is effected and the mixture is then cooled to about 30°–35° C. Five ml. of an aqueous 4 M trimethylamine solution (0.02 mole) are then added to the reactor.

The pH of the reaction mixture is adjusted to about 11.5 and 38 gms. (0.2 mole) of chloro-O,O-diethylphosphorothioate in a xylene-boiling range hydrocarbon solvent is added to the reactor. The mixture is agitated and the reaction temperature is maintained at about 30°±4° C. The progress of the reaction is followed by the disappearance of the chloro-O,O-diethylphosphorothioate as indicated by infrared spectroscopy. The reaction is substantially complete within 2 hours.

The reaction mixture is then washed with dilute sulfuric acid and water to remove the trimethylamine. The thiophosphate ester thus formed comprises O,O-diethyl-O-4-pyrimidinylphosphorothioate.

Repetition of this example, in which the initial reactant 4-hydroxypyrimidine is replaced by 0.21 mole of 7-hydroxycoumarin; 2,4,6-trihydroxy-*s*-triazine; thiophenol; and *p*-methylthiophenol respectively, provides substantially quantitative yields of product. The phosphate esters formed are O,O-diethyl-O-(7-coumarinyl)phosphorothioate; O,O-diethyl-O-2-(4,6-dihydroxytriazinyl) phosphorothioate; O,O-diethyl-S-phenylphosphorodithioate; and O,O-diethyl-S-*p*-methylphenylphosphorodithioate, respectively.

In the procedure of this example, a portion of the initial reactant may be first added to the reactor with the remainder being added simultaneously, in aliquots, with the chloro-O,O-diethylphosphorothioate.

As will be understood by those skilled in the art, what has been described are preferred embodiments of the invention, however, many modifications, changes and substitutions can be made therein without departing from the scope and spirit of the following claims.

1. A process which comprises S-arene-O,O-dialkylphosphorodithioate.
   reacting chloro-O,O-dialkylphosphorothioate wherein the alkyl substituent has from 1 to 8 carbons and the alkali metal salt of an organic compound selected from the group consisting of phenol; substituted phenols having at least one substituent selected from the group consisting of nitro, methyl, chloro and carbonitrile radicals and mixtures thereof; and thiophenol and substituted thiophenols having a substituent selected from the group consisting of methyl, methoxy and chloro radicals in a liquid reaction mixture in the presence of a trimethylamine catalyst at a temperature of between about 0° and 80° C. and a pH within the range of about 7.5 to 11.5 to form an organophosphate ester selected from the group consisting of O-arene-O,O-dialkylphosphorothioate and S-arene-O,O-dialkylphosphorodithioate.

2. The process as defined in claim 1 in which said trimethylamine is present in the reaction mixture in an amount ranging from about 0.02 to 5 moles per mole of said chloro-O,O-dialkylphosphorothioate 3. The process as defined in claim 1 in which the trimethylamine catalyst is introduced into the reaction mixture in an aqueous solution.

4. The process as defined in claim 1 in which the alkali metal salt of said organic compound is the sodium salt of a substituted phenol and said reaction mixture is provided by admixing a water-immiscible organic phase containing said chloro-O,O-dialkylphosphorothioate with an aqueous phase containing said sodium salt of the substituted phenate.

5. The process as defined in claim 1 in which said chloro-O,O-dialkylphosphorothioate is chloro-O,O-diethylphosphorothioate.

6. The process as defined in claim 1 in which said reaction mixture is acidified upon completion of said reaction.

7. The process as defined in claim 1 in which said chloro-O,O-dialkylphosphorothioate is chloro-O,O-diethylphosphorothioate, said alkali metal salt of an organic compound is the sodium salt of a substituted phenol and said reaction is carried out at a temperature of between about 10° and 45° C.

8. The process as defined in claim 7 in which said reaction mixture is provided by admixing said chloro-O,O-diethylphosphorothioate with an aqueous phase containing said sodium salt of a substituted phenol and said trimethylamine catalyst.

9. The process as defined in claim 7 in which said reaction mixture is provided by admixing said sodium salt of a substituted phenol with a water-immiscible organic phase comprising said chloro-O,O-diethylphosphorothioate in an organic solvent therefor in the presence of said trimethylamine catalyst.

10. The process as defined in claim 7 in which said reaction mixture is provided by admixing an organic phase comprising said chloro-O,O-diethylphosphorothioate in an organic solvent therefor with an aqueous phase comprising said sodium salt of a substituted phenol and said trimethylamine catalyst.

UNITED STATES PATENT OFFICE
CERTIFICATE OF CORRECTION

Patent No. 3,607,991      Dated September 21, 1971

Inventor(s) Willard D. Peterson et al.

It is certified that error appears in the above-identified patent and that said Letters Patent are hereby corrected as shown below:

On the cover sheet [73] "Kerr-McGee Corporation" should read -- Kerr-McGee Chemical Corp. --. Column 1, line 7, "organic" should read -- organo --; line 49, cancel "O-dialkphosphorothioate". Column 2, line 39, cancel "O-dial-"; line 40, cancel "kylphosphorothioate"; same line 40, after "reacted" insert -- with --. Column 3, line 1, after "6" insert -- - --. Column 6, line 45, "temperatures" should read -- temperature --. Column 8, line 4, cancel "S-arene-O, O-dial-"; line 5, cancel "kylphosphorodithioate".

Signed and sealed this 15th day of August 1972.

(SEAL)
Attest:

EDWARD M. FLETCHER, JR.
Attesting Officer

ROBERT GOTTSCHALK
Commissioner of Patents